US009357517B2

(12) United States Patent
Yu

(10) Patent No.: US 9,357,517 B2
(45) Date of Patent: May 31, 2016

(54) APPARATUS AND METHOD FOR WIRELESS BASEBAND PROCESSING

(71) Applicant: Marvell World Trade Ltd., St. Michael (BB)

(72) Inventor: Mao Yu, San Jose, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 485 days.

(21) Appl. No.: 13/913,877

(22) Filed: Jun. 10, 2013

(65) Prior Publication Data

US 2013/0329720 A1    Dec. 12, 2013

Related U.S. Application Data

(60) Provisional application No. 61/658,885, filed on Jun. 12, 2012, provisional application No. 61/765,424, filed on Feb. 15, 2013.

(51) Int. Cl.
H04W 56/00 (2009.01)
H04L 27/00 (2006.01)
H04L 27/26 (2006.01)

(52) U.S. Cl.
CPC ......... H04W 56/002 (2013.01); H04L 27/0008 (2013.01); H04L 27/2662 (2013.01); H04L 27/2626 (2013.01); H04L 27/2647 (2013.01)

(58) Field of Classification Search
CPC ...... H04B 1/406; H04B 1/403; H04L 7/0029; H03M 1/1255
See application file for complete search history.

(56) References Cited

U.S. PATENT DOCUMENTS

| 7,274,652 | B1 * | 9/2007 | Webster | H04L 27/0008 370/204 |
|---|---|---|---|---|
| 7,388,931 | B1 | 6/2008 | Hsu et al. | |
| 7,813,374 | B2 | 10/2010 | Moorti et al. | |
| 8,400,968 | B2 | 3/2013 | Liu et al. | |
| 2001/0037351 | A1 * | 11/2001 | Hellberg | 708/313 |
| 2002/0159544 | A1 * | 10/2002 | Karaoguz | 375/329 |
| 2004/0152418 | A1 * | 8/2004 | Sinha et al. | 455/42 |
| 2004/0165564 | A1 * | 8/2004 | Kim et al. | 370/338 |

(Continued)

OTHER PUBLICATIONS

Jesus Arias, Peter Kiss, Vladimir Prodanov, Vito Boccuzzi, Mihai Banu, David Bisbal, Jacinto San Pablo, Luis Quintanilla, and Juan Barbolla, A 32-mW 320-MHz continuous-time complex delta-sigma ADC for multi-mode wireless-LAN receivers, IEEE, Feb. 2006.*

Primary Examiner — Aristocratis Fotakis

(57) ABSTRACT

Apparatuses and methods for receiving and transmitting signals are provided. A baseband processor includes receiver circuitry including single carrier receiver circuitry for demodulating a received single carrier signal and multi-carrier receiver circuitry for demodulating a received multi-carrier signal. The single carrier receiver circuitry includes a first digital interpolator, and the multi-carrier receiver circuitry includes a second digital interpolator. Symbol timing recovery is executed by adjusting an interpolation phase of the first digital interpolator or the second digital interpolator. The baseband processor also includes transmitter circuitry for encoding a signal to be transmitted. The baseband processor further includes a clock coupled to the receiver circuitry and coupled to the transmitter circuitry. The clock is configured to supply a clock signal that is processed to generate clock sampling frequencies for sending and receiving a single carrier signal and a multi-carrier signal.

13 Claims, 8 Drawing Sheets

(56) References Cited

U.S. PATENT DOCUMENTS

| | | | |
|---|---|---|---|
| 2004/0203557 A1* | 10/2004 | Zhang | 455/403 |
| 2004/0264600 A1* | 12/2004 | Kao et al. | 375/316 |
| 2006/0034366 A1* | 2/2006 | Schmidt et al. | 375/239 |
| 2006/0067429 A1* | 3/2006 | Beyer | H04B 1/04 375/309 |
| 2009/0046790 A1 | 2/2009 | Soliman | |
| 2009/0238240 A1 | 9/2009 | Lakkis | |
| 2012/0163415 A1* | 6/2012 | Su et al. | 375/130 |

* cited by examiner

APPARATUS AND METHOD FOR WIRELESS BASEBAND PROCESSING

CROSS-REFERENCE TO RELATED APPLICATIONS

This disclosure claims priority to U.S. Provisional Patent Application No. 61/658,885, filed on Jun. 12, 2012, and to U.S. Provisional Patent Application No. 61/765,424, filed on Feb. 15, 2013, which are incorporated herein by reference in their entireties.

TECHNICAL FIELD

The technology described in this document relates generally to wireless communications and more particularly to a wireless baseband processor using a single clock source.

BACKGROUND

Wireless communication systems such as Wireless Local Area Networks (WLANs) include multiple wireless communication devices that communicate over one or more wireless channels. Various examples of wireless communication devices include mobile phones, smart phones, wireless routers, and wireless hubs. In some cases, wireless communication electronics are integrated with data processing equipment such as laptops, personal digital assistants, and computers. Wireless communication systems can use one or more wireless communication technologies such as orthogonal frequency division multiplexing (OFDM). In an OFDM-based wireless communication system, a data stream is split into multiple data substreams. Such data substreams are sent over different OFDM subcarriers, which may be referred to as tones or frequency tones. WLANs such as those defined in the Institute of Electrical and Electronics Engineers (IEEE) wireless communications standards, e.g., IEEE 802.11a, IEEE 802.11n, or IEEE 802.11ac, can use OFDM to transmit and receive signals. WLANs can also use single carrier modulation technology, such as the IEEE 802.11b standard.

SUMMARY

The present disclosure is directed to apparatuses and methods for receiving and transmitting signals associated with one or more wireless communication protocols. An apparatus for receiving signals associated with one or more wireless communication protocols includes single carrier receiver circuitry for demodulating a received single carrier signal, where the single carrier receiver circuitry includes a first digital interpolator. The apparatus also includes multi-carrier receiver circuitry for demodulating a received multi-carrier signal, where the multi-carrier receiver circuitry includes a second digital interpolator. Symbol timing recovery is executed in the apparatus by adjusting an interpolation phase of the first digital interpolator or the second digital interpolator. The apparatus further includes a clock coupled to the single carrier receiver circuitry and coupled to the multi-carrier receiver circuitry. The clock is configured to supply a clock signal that is processed to generate a plurality of clock sampling frequencies for demodulating the received single carrier signal and the received multi-carrier signal.

In another example, an apparatus for transmitting signals associated with one or more wireless communication protocols includes single carrier transmitter circuitry for encoding a single carrier signal to be transmitted. The apparatus also includes multi-carrier transmitter circuitry for encoding a multi-carrier signal to be transmitted. The apparatus further includes a clock coupled to the single carrier transmitter circuitry and coupled to the multi-carrier transmitter circuitry. The clock is configured to supply a clock signal that is processed to generate a plurality of clock sampling frequencies for encoding the single carrier signal to be transmitted and the multi-carrier signal to be transmitted.

In another example, a baseband processor for full-duplex communication of signals associated with one or more wireless communication protocols includes receiver circuitry including single carrier receiver circuitry for demodulating a received single carrier signal and multi-carrier receiver circuitry for demodulating a received multi-carrier signal. The single carrier receiver circuitry includes a first digital interpolator, and the multi-carrier receiver circuitry includes a second digital interpolator. Symbol timing recovery is executed in the baseband processor by adjusting an interpolation phase of the first digital interpolator or the second digital interpolator. The baseband processor also includes transmitter circuitry for encoding a signal to be transmitted, where the signal to be transmitted is a single carrier signal or a multi-carrier signal. The baseband processor further includes a clock coupled to the receiver circuitry and coupled to the transmitter circuitry. The clock is configured to supply a clock signal that is processed to generate a plurality of clock sampling frequencies for sending and receiving both a single carrier signal and a multi-carrier signal.

In another example, in a method for processing a received signal at a baseband processor, the received signal is detected as being a single carrier signal or a multi-carrier signal. If the received signal is the single carrier signal, the received signal is demodulated via single carrier receiver circuitry. The single carrier receiver circuitry includes a first digital interpolator. If the received signal is the multi-carrier signal, the received signal is demodulated via multi-carrier receiver circuitry. The multi-carrier receiver circuitry includes a second digital interpolator. Symbol timing recovery is executed by adjusting an interpolation phase of the first digital interpolator or the second digital interpolator. A clock signal is generated using a clock that is coupled to the single carrier receiver circuitry and coupled to the multi-carrier receiver circuitry. A clock sampling frequency is generated by processing the clock signal, where the clock sampling frequency is received by the single carrier receiver circuitry or the multi-carrier receiver circuitry for demodulating the single carrier signal or the multi-carrier signal.

In another example, in a method for processing a signal to be transmitted at a baseband processor, the signal to be transmitted is detected as being a single carrier signal or a multi-carrier signal. If the signal to be transmitted is the single carrier signal, the signal is encoded to be transmitted via single carrier transmitter circuitry. If the signal to be transmitted is the multi-carrier signal, the signal to be transmitted is encoded via multi-carrier receiver circuitry. A clock signal is generated using a clock that is coupled to the single carrier transmitter circuitry and coupled to the multi-carrier transmitter circuitry. A clock sampling frequency is generated by processing the clock signal. The clock sampling frequency is received by the single carrier transmitter circuitry or the multi-carrier transmitter circuitry for encoding the single carrier signal or the multi-carrier signal.

DETAILED DESCRIPTION

Figure 1:
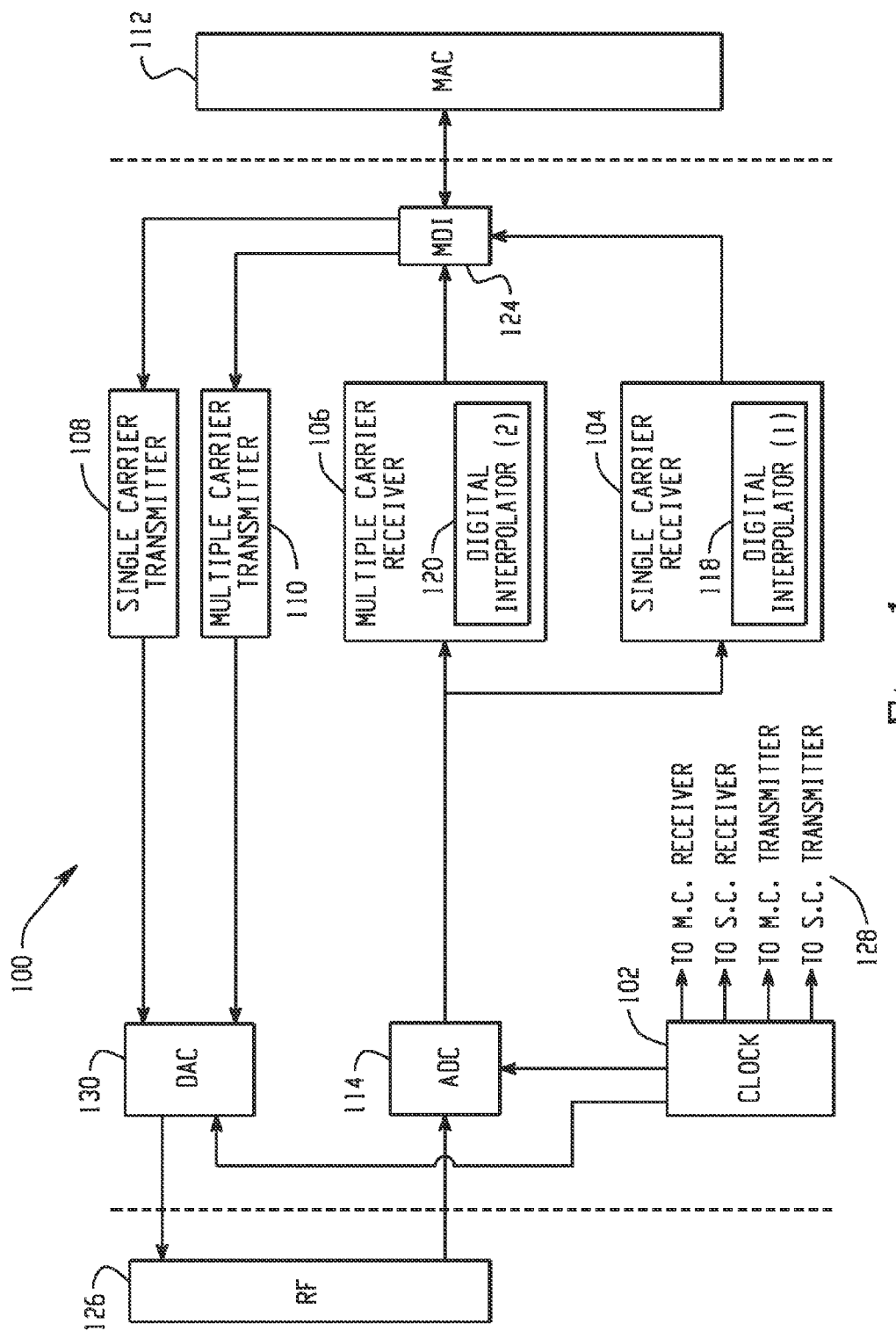
FIG. 1 is a block diagram depicting an example baseband processor using a single clock with a fixed frequency.

FIG. 1 is a block diagram depicting an example baseband processor 100 using a single clock 102 with a fixed frequency. The example baseband processor 100 is used in a wireless communication system, such as an IEEE 802.11 standardized Wireless Local Area Network (WLAN) system. In such an IEEE 802.11 standardized WLAN, the two different kinds of packets that are supported include a single carrier (e.g., 802.11b) packet and a multi-carrier, orthogonal frequency division multiplexing (OFDM) (e.g., 802.11a, 802.11n, and 802.11 ac) packet. For 802.11b single carrier packets transmitted and received using the example baseband processor 100, a spreading chip rate is 11 Mchip/s, and an oversampling rate for signal processing of such packets is a multiple of 11 MHz. By contrast, for OFDM packets transmitted and received using the example baseband processor 100, a time domain sampling rate is a multiple of 20 MHz, with the sampling rate being dictated based on a device bandwidth, among other factors. The terms "multi-carrier" and "OFDM" are discussed throughout this disclosure and are in most cases interchangeable. Thus, where OFDM is referenced, other multi-carrier modulation and demodulation techniques may be used. Similarly, references to multi-carrier modulation and demodulation include OFDM implementations.

In order to receive both the single carrier packets and the OFDM packets, the example baseband processor 100 includes single carrier receiver circuitry 104 and multi-carrier receiver circuitry 106. Similarly, in order to transmit both the single carrier packets and the OFDM packets, the example baseband processor 100 includes single carrier transmitter circuitry 108 and multi-carrier transmitter circuitry 110. As noted above, the example baseband processor 100 includes the single clock 102 and does not include an additional clock source. The single clock 102 operates at 320 MHz and is configured to be used in processing both the single carrier packets and the OFDM packets. The use of the single clock 102 is in contrast to systems utilizing multiple clocks (e.g., systems that use a 176 MHz clock to process single carrier packets and a 320 MHz clock to process OFDM packets). As illustrated at 128, the single clock 102 is coupled to the single carrier receiver circuitry 104, the multi-carrier receiver circuitry 106, the single carrier transmitter circuitry 108, and the multi-carrier transmitter circuitry 110. The single clock source 102 supplies a clock signal to the modules 104, 106, 108, 110 of the example baseband processor 100, and within the modules 104, 106, 108, 110, the provided clock signal is processed to generate a plurality of clock sampling frequencies. The plurality of clock sampling frequencies are used in the single carrier receiver circuitry 104, the multi-carrier receiver circuitry 106, the single carrier transmitter circuitry 108, and the multi-carrier transmitter 110 for decoding and encoding both the single carrier packets and the multi-carrier packets.

In an alternative implementation, the clock signal is not supplied directly to the modules 104, 106, 108, 110 and is instead provided to a clock generation and distribution module. In the clock generation and distribution module, the clock signal is processed to generate a plurality of clock sampling frequencies. The plurality of clock sampling frequencies are subsequently provided to the modules 104, 106, 108, 110 and used in receiving and transmitting both single carrier signals and multi-carrier signals.

The example system of FIG. 1 includes a medium access control (MAC) layer 112 and a radio frequency (RF) layer 126. The MAC layer 112 can include one or more MAC control units (MCUs). The example baseband processor 100 receives one or more digital data streams from the MAC layer 112 via a MAC Data Interface (MDI) 124. Based on the received one or more digital data streams, the example baseband processor 100 performs encoding (e.g., based on a Barker code) and modulation, thus enabling the one or more data streams to be wirelessly transmitted via one or more antennas. To further support the transmission of the one or more digital data streams, the example baseband processor 100 includes a digital to analog converter (DAC) 130 to convert the one or more digital data streams to an analog baseband signal. The sampling rate of the DAC 130 is 80 MHz for a 20 MHz device or 160 MHz for a 40 MHz device. The RF layer 126 receives the analog baseband signal and generates an RF signal that has been converted from the analog baseband signal for transmission via the one or more antennas.

As described above, the RF layer 126 is used to generate the RF signal for transmission. The RF layer 126 is also used in processing RF signals received via one or more antennas. Thus, the RF layer 126 is coupled to the one or more antennas to receive a radiated RF signal, and the RF layer 126 converts the received RF signal to a baseband signal and supplies the baseband signal to an analog to digital converter (ADC) 114 of the example baseband processor 100. The example baseband processor 100 processes the converted baseband signal and supplies digital information via the MDI 124 to the MAC 112. As illustrated in FIG. 1, both the ADC 114 and the DAC 130 are coupled to the clock 102 and are responsive to a clock sampling frequency supplied by the clock 102. The ADC 114 and the DAC 130 may each receive a separate, different clock sampling frequency from the clock 102. Although FIG. 1 depicts the clock 102 as being connected directly to both the ADC 114 and the DAC 130, in other implementations, the clock sampling frequencies supplied to the ADC 114 and the DAC 130 are provided by a clock generation module that is coupled to the ADC 114 and the DAC 130. In such implementations, a clock signal supplied by the clock 102 is processed by the clock generation module to generate the clock sampling frequencies for the ADC 114 and the DAC 130.

The single carrier receiver circuitry 104 includes a first digital interpolator 118, and the multi-carrier receiver circuitry 106 includes a second digital interpolator 120. The first digital interpolator 118 and the second digital interpolator 120 are used in performing timing recovery in the single carrier receiver circuitry 104 and the multi-carrier receiver circuitry 106. For a wireless communication system utilizing the example baseband processor 100, reference clocks used in a transmitting portion of the communication system and a receiving portion of the communication system are not exactly the same. Thus, to detect data correctly in the receiving portion, a timing element of the receiving portion is synchronized with the incoming, transmitted signal from the transmitting portion. The process of synchronizing the receiving portion with the transmitted signal enables the timing recovery. In the example baseband processor 100 of FIG. 1, pure digital timing recovery is executed using the first digital interpolator 118 or the second digital interpolator 120. In the pure digital timing recovery, a sampling phase of the ADC 114 is fixed, and the timing tracking is performed using the digital interpolators 118, 120 by adjusting an interpolation phase of the digital interpolators 118, 120. The interpolation phase may be generated based on a look-up table using a numerically controlled oscillator, for example. The pure digital timing recovery executed via the digital interpolators 118, 120 of FIG. 1 is in contrast to a method of timing recovery performed using analog clock phase interpolators. When the analog clock phase interpolators are used in performing timing recovery, a sampling clock of the ADC 114 is adjusted to track an incoming signal. In using the pure digital timing recovery via the digital interpolators 118, 120, and the single clock 102, one or more analog clock phase interpolators can be effectively removed from the baseband processor 100 (e.g., two analog clock phase interpolators operating at 320 MHz and 176 MHz, respectively, may be effectively removed from the baseband processor 100).

In the example baseband processor 100 of FIG. 1, using the single clock 102 to generate the clock sampling frequencies needed for transmitting and receiving both single carrier and multi-carrier signals eliminates a need for extraneous clocks (e.g., a 176 MHz clock for transmitting and receiving single carrier signals is not included in the example baseband processor 100). Further, using the single clock 102 in this manner eliminates a need for a clock switch when an operation mode of the example baseband processor 100 changes from an OFDM mode to a single carrier mode, and vice versa. The use of the single clock 102 also enables a simplification of a digital to analog interface in the baseband processor 100. For example, use of the single clock 102 and the digital interpolators 118, 120 allows for a baseband processor implementation that does not include an analog phase interpolator for controlling a clock sampling phase of the ADC 114. As another example, use of the single clock 102 and the digital interpolators 118, 120 eliminates or lowers ADC 114 interface timing variations due to a clock phase change. Accurate time measurements of packet arrival and departure for both single carrier and multi-carrier packets are achieved using the single clock 102 and the digital interpolators 118, 120. Use of the single clock 102 and the digital interpolators 118, 120 also enables the example baseband processor 100 to meet time difference of arrival (TDOA) requirements imposed by various standards or manufacturers of wireless equipment.

Figure 2:
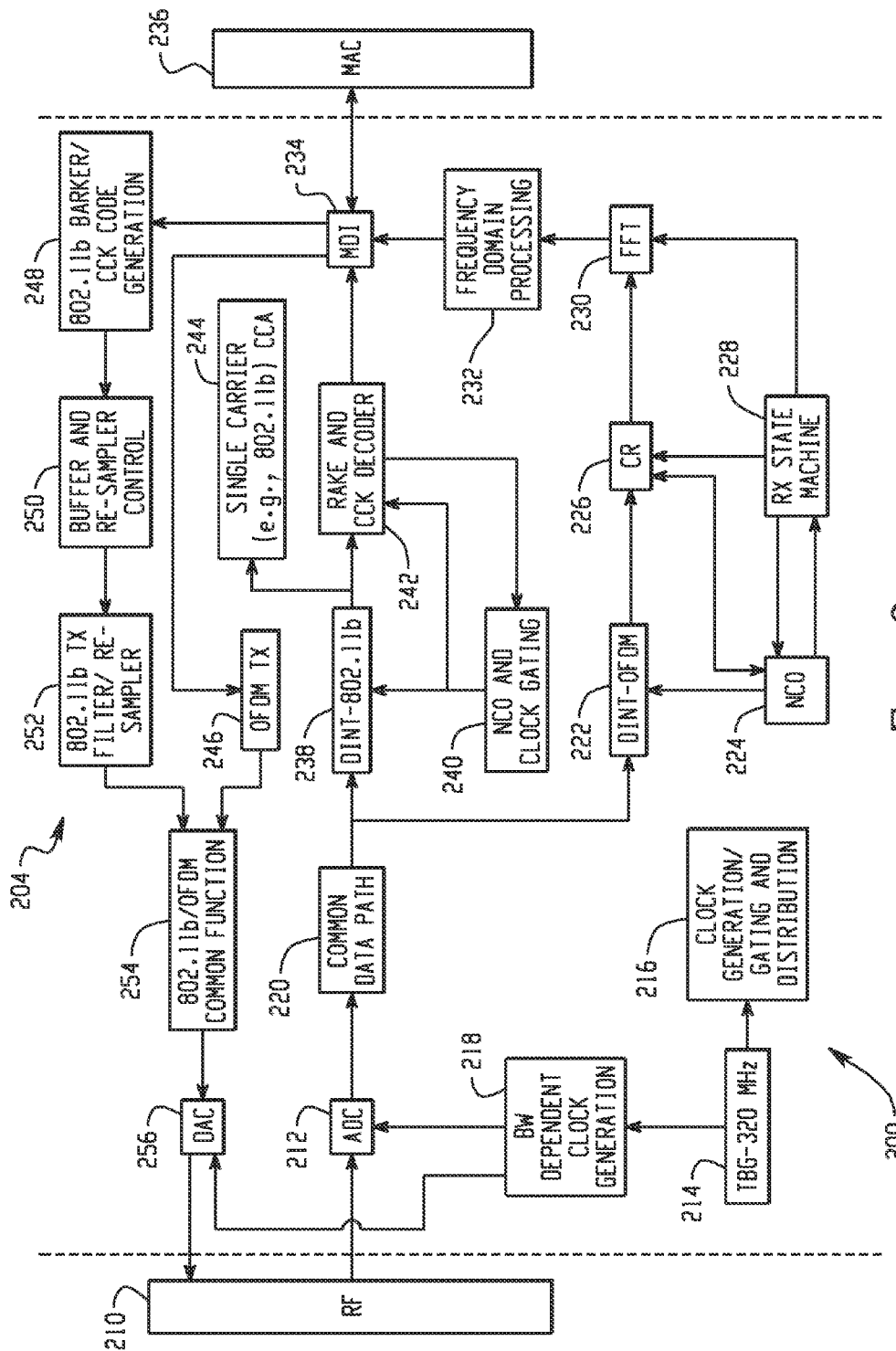
FIG. 2 is a block diagram illustrating modules of an example wireless terminal.

FIG. 2 is a block diagram illustrating modules of an example wireless terminal 200. The wireless terminal 200 is used in a wireless communication system, such as an IEEE 802.11 standardized WLAN system. In FIG. 2, the wireless terminal 200 includes an RF layer 210, a MAC layer 236, and a single clock baseband processor 204. The MAC layer 236 is coupled to the single clock baseband processor 204 via a MAC Data Interface (MDI) 234, enabling one or more digital data streams to be received from the MAC layer 236 and subsequently encoded in the single clock baseband processor 204. To support the transmission of the one or more digital data streams, the single clock baseband processor 204 includes a digital to analog converter (DAC) 256 to convert the one or more digital data streams to an analog baseband signal. The RF layer 210 receives the analog baseband signal and generates an RF signal that has been converted from the analog baseband signal for transmission via one or more antennas.

The RF layer 210 is also used in processing an RF signal received via the one or more antennas. For example, the RF layer 210 converts the received RF signal to a baseband signal and supplies the baseband signal to an analog to digital converter (ADC) 212 of the single clock baseband processor 204. The ADC 212 and the DAC 256 are coupled to a 320 MHz clock 214 via a first clock generation module 218. As illustrated in FIG. 2, the first clock generation module 218 supplies one or more clock sampling frequencies to the ADC 212 and to the DAC 256 depending on a device bandwidth (BW). The 320 MHz clock 214 is also coupled to a second clock generation module 216 (i.e., a clock generation/gating and distribution module 216). The second clock generation module 216 includes clock gating and clock distribution functionality.

The single clock baseband processor 204 of FIG. 2 includes single carrier receiver circuitry, multi-carrier receiver circuitry, single carrier transmitter circuitry, and multi-carrier transmitter circuitry to support the receipt and transmission of both single carrier packets and OFDM packets. The clock distribution functionality of the second clock generation module 216 couples the 320 MHz clock 214 to the single carrier receiver circuitry, the multi-carrier receiver circuitry, the single carrier transmitter circuitry, and the multi-carrier transmitter circuitry of the baseband processor 204. The 320 MHz clock 214 supplies a clock signal to the second clock generation module 216, and the provided clock signal is processed by the second clock generation module 216 to generate a plurality of clock sampling frequencies. The plurality of clock sampling frequencies are used in the single carrier receiver circuitry, the multi-carrier receiver circuitry, the single carrier transmitter circuitry, and the multi-carrier transmitter circuitry of the baseband processor 204 for transmitting and receiving the single carrier packets and the multi-carrier packets.

As described above, the RF layer 210 converts a received RF signal to a baseband signal and supplies the baseband signal to the analog to digital converter (ADC) 212. The ADC 212 converts the analog baseband signal to a digital signal, and single carrier receiver circuitry and multi-carrier receiver circuitry of the single clock baseband processor 204 receive the digital signal via a common data path 220. The single carrier receiver circuitry includes a first digital interpolator 238 (labeled "DINT-802.11b" in FIG. 2), and the multi-carrier receiver circuitry includes a second digital interpolator 222 (labeled "DINT-OFDM"). Both of the digital interpolators 222, 238 are used for timing recovery in the single clock baseband processor 204 (i.e., to correctly detect received data in the single clock baseband processor 204, a timing element of the single clock baseband processor 204 is synchronized with an incoming, transmitted signal). The timing tracking is performed by the digital interpolators 222, 238 by adjusting the interpolation phase of the digital interpolators 222, 238, and a clock sampling phase of the ADC 212 is fixed. In performing the timing tracking in this manner (i.e., using the digital interpolators 222, 238 to perform pure digital timing recovery), the ADC sampling clock is not adjusted, and analog clock phase interpolators are not used.

A control scheme used in the first digital interpolator 238 (i.e., the single carrier digital interpolator) varies from that used in the second digital interpolator 222 (i.e., the multi-carrier digital interpolator). To achieve good performance for high quadrature amplitude modulation (QAM) OFDM, an interpolator structure of the second digital interpolator 222 may be relatively complex, and the second digital interpolator 222 may have a relatively high power consumption. Conversely, processing single carrier (e.g., IEEE 802.11b) signals may not require a complex interpolator (i.e., the first digital interpolator 238 may be less complex as compared to the second digital interpolator 222). The first digital interpolator 238 for processing single carrier signals runs during all of the time before a packet is detected (i.e., a receiver noise period) and continues to run if the packet is a single carrier packet. The second digital interpolator 222 for processing multi-carrier signals runs after an OFDM packet is detected. The receiver noise period is the period of time when there is no traffic over the wireless channel. In the IEEE 802.11 standardized system, devices do not know when the incoming packet will be transmitted, and the receiver needs to monitor the medium at all times. The first digital interpolator 238 utilizes a modified control and clocking scheme that enables the first digital interpolator 238 to process both 802.11b control signals (CS) and 802.11b data signals.

As described above, the multi-carrier receiver circuitry includes the second digital interpolator 222. The purpose of the second digital interpolator 222 is to track the timing offset between a transmitting device and a receiving device (i.e., to perform timing recovery, as described above). The second digital interpolator 222 is a cubic interpolator that utilizes a farrow structure. The second digital interpolator 222 uses a sampling rate that is the same as that of the ADC 212 in order to maintain performance. The single clock baseband processor 204 of FIG. 2 includes the 320 MHz clock 214, which is coupled to, among other components, the second digital interpolator 222 of the multi-carrier receiver circuitry. The 320 MHz clock 214 supplies a clock signal to the clock generation/gating and distribution module 216, thus enabling the clock generation/gating and distribution module 216 to process the clock signal and produce the clock sampling frequency utilized by the second digital interpolator 222. By taking advantage of a guard interval (GI) of a received communication, processing occurring after the second digital interpolator 222 (i.e., post-DINT processing) does not require complicated clock gating in the multi-carrier receiver circuitry.

As depicted in FIG. 2, the multi-carrier receiver circuitry further includes a numerically controlled oscillator (NCO) 224, a carrier recovery (CR) module 226, a receiver state machine 228, and a fast Fourier transform (FFT) module 230. The NCO 224 is a digital signal generator that creates a synchronous (i.e., clocked), discrete-time, discrete-valued representation of a waveform. The synchronous, discrete-valued representation of the waveform may be, for example, a sinusoidal signal. In the example system of FIG. 2, control of the second digital interpolator 222 and the NCO 224 is combined with a packet processing control. The CR module 226 is used to estimate a carrier frequency offset (CFO), where the CFO is equal to a difference between a transmitter carrier frequency and a receiver carrier frequency. The CFO reflects the fact that the transmitter and receiver in a wireless communication system are two different devices, such that the different devices will have carrier frequencies that differ from a nominal carrier frequency value and from each other. The CR module 226 receives an output of the second digital interpolator 222 and is also coupled to the NCO 224. The receiver state machine 228 performs various functions including (a) determining destination address, encryption status, frame type, retry status, and special-frame status, (b) determining whether a time-critical response is needed, and (c) filtering (e.g., routing a received frame to a host CPU), among others. The FFT module 230 receives outputs from the CR module 226 and the receiver state machine 228 and converts the received signal from a time domain signal into a frequency domain signal. A frequency domain processing module 232 is used to process the frequency domain signal that is output from the FFT module 230. A resulting signal that is output from the frequency domain processing module 232 is transferred to the MAC layer 236 via the MDI 234.

As described above, the single carrier receiver circuitry includes the first digital interpolator 238 for processing received single carrier signals. The purpose of the first digital interpolator 238 is to track the timing offset between a transmitting device and a receiving device (i.e., to perform timing recovery, as described above). The first digital interpolator 238 may be a linear digital interpolator with an operation clock of 40 MHz or may be a different type of digital interpolator with an operation clock operating at a different frequency. An input rate of the first digital interpolator 238 is 40 MHz, and an output data rate is effectively 22 MHz. As depicted in FIG. 2, the single carrier receiver circuitry further includes an NCO and clock gating control module 240, a rake and complementary code keying (CCK) decoder module 242, and a single carrier clear channel assessment (CCA) (e.g., 802.11b CCA) module 244. The rake and CCK decoder module 242 is used to decode a received CCK symbol and to provide a resulting output to the MAC layer 236 via the MDI 234. The single carrier CCA module 244 is configured to determine whether a communication channel between a transmitter and a receiver are busy or free based on whether RF activity is present or absent in the communication channel (i.e., to determine a clear channel assessment for the communication channel).

Figure 3:
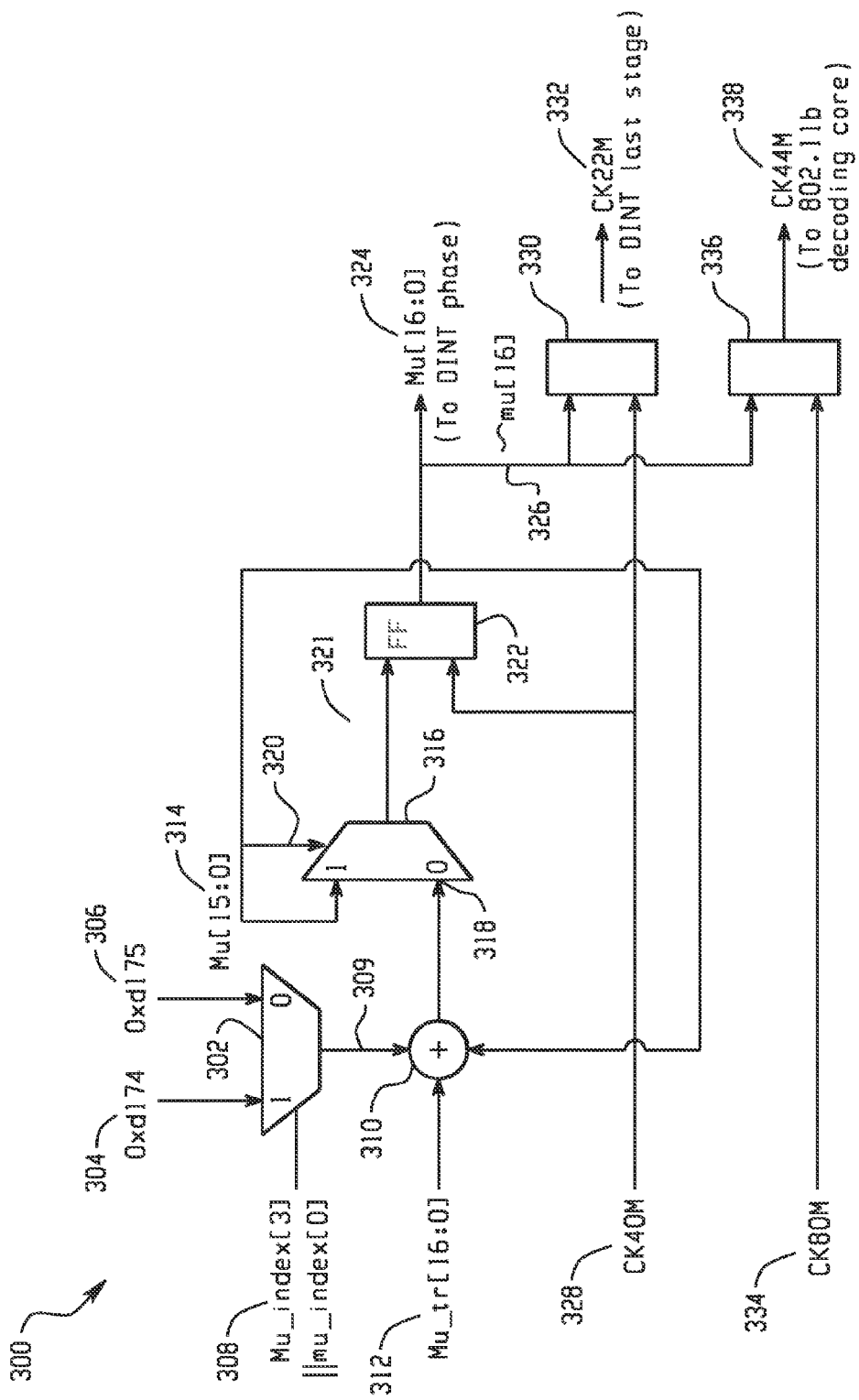
FIG. 3 is a block diagram illustrating an example implementation of a numerically controlled oscillator (NCO) and clock gating control module for use in a baseband processor.

FIG. 3 is a block diagram illustrating an example implementation 300 of a numerically controlled oscillator (NCO) and clock gating control module for use in a baseband processor. The example implementation 300 of the NCO and clock gating control module of FIG. 3 may be implemented in the context of the single clock baseband processor 204 of FIG. 2 (e.g., as the NCO and clock gating control module 240 of FIG. 2). With reference to FIG. 2, the example implementation 300 of the NCO and clock gating control module may be coupled to both the first digital interpolator 238 and the rake and CCK decoder 242. As noted above, the first digital interpolator 238 has an operation clock of 40 MHz, an input data rate of 40 MHz, and an output data rate of effectively 22 MHz. The 40 MHz clock sampling frequency for the operation clock and the input data rate is generated based on the 320 MHz clock 214. The interpolation phase of the first digital interpolator 238 may be generated or adjusted by the NCO and clock gating control module 240. The interpolation phase is generated or adjusted based on a look-up table and may be implemented via clock or sampling rate conversion. As described previously, the first digital interpolator 238 is used in performing symbol timing recovery by adjusting the interpolation phase of the digital interpolator 238 (i.e., ADC sampling clock is fixed, and pure digital timing recovery is performed).

To generate the 22 MHz clock for the output data rate of the first digital interpolator 238, a control signal is generated. Based on the control signal, an effective 22 MHz clock is generated and provided to the interpolator output stage of the first digital interpolator 238 of FIG. 2. Similarly, based on the control signal, an effective 44 MHz clock is generated and provided to the rake and CCK decoder 242 of FIG. 2. The effective 44 MHz clock provided to the rake and CCK decoder 242 has four cycles in an 11 MHz clock period in order to enable hardware sharing. In order to generate the 44 MHz effective post processing clock, an input to the second digital interpolator 238 may be upsampled, and the second digital interpolator 238 may be operated at 80 MHz. Alternatively, to generate the effective 44 MHz clock provided to the rake and CCK decoder 242, a data sampling rate may be kept static, and the 44 MHz effective clock may be generated from the 80 MHz clock and aligned with effective data samples.

These concepts are illustrated in the example implementation 300 of FIG. 3. In FIG. 3, the example implementation 300 of the NCO and clock gating control module receives a CK40M signal 328 (i.e., a 40 MHz clock sampling frequency) and a CK80M signal 334 (i.e., an 80 MHz clock sampling frequency). Phase accumulator 310 is used to generate phase mu[16:0] value 324. The inputs of phase accumulator 310 include phase constants, 0xd174 (304) and 0xd175 (306), for 40 MHz to 22 MHz sampling rate conversion, timing offset mu_tr[16:0] signal 312 from symbol timing offset estimate, and current phase mu[16:0]. An output 318 of the phase accumulator 310 will be latched to flip flop 322, if the MSB of current phase mu[16] 320 is not 1. If mu[16] 320 is 1, current phase mu[16:0] 324 will be updated by mu[15:0] 314. In the context of the single clock baseband processor 204 of FIG. 2, the 40 MHz clock signal 328 and the 80 MHz clock signal 334 are received from the 320 MHz clock 214 (e.g., via the clock generation/gating and distribution module 216). The CK40M signal 328 is received at a first clock gating cell 330, where an operation of the first clock gating cell 330 is performed using the CK40M signal 328 and an inverse of an Mu[16] value 326 (i.e., ~Mu[16]). An output of the clock gating cell 330 is a CK22M signal 332 (i.e., a 22 MHz clock sampling frequency) that is provided to a last stage (i.e., an output stage) of a digital interpolator (e.g., the first digital interpolator 238 of the single carrier receiver circuitry of FIG. 2). As noted above, to generate the 22 MHz clock sampling frequency 332 for the output stage of the first digital interpolator 238, a control signal is generated. The control signal may be implemented via the inverse of the Mu[16] value 326, where the inverse of the Mu[16] value 326 is a control signal that is combined with the CK40M signal 328 to generate the 22 MHz clock sampling frequency 332.

Similarly, the CK80M signal 334 is received at a second clock gating cell 336, where the operation of the second clock gating cell 336 is performed using the CK80M signal 334 and the inverse of the Mu[16] value 326 (i.e., ~Mu[16]). An output of the clock gating cell 336 is a CK44M signal 338 (i.e., a 44 MHz clock sampling frequency) that is provided to a single carrier (e.g., 802.11b) decoding core (e.g., the rake and CCK decoder 242 of the single carrier receiver circuitry of FIG. 2). The inverse of the Mu[16] value 326 is produced using a Mu[16:0] value 324, where the Mu[16:0] value 324 is used to set an interpolation phase of a digital interpolator (e.g., the Mu[16:0] valve 324 is provided to DINT phase of the first digital interpolator 238 of FIG. 2). As noted above, to generate the 44 MHz clock sampling frequency 338 for the 802.11b CCK/Barker core processing (e.g., the rake and CCK decoder 242), a control signal is used. The control signal is implemented via the inverse of the Mu[16] value 326, where the inverse of the Mu[16] value 326 is a control signal that is combined with the CK80M signal 334 to generate the 44 MHz clock sampling frequency 338.

The example implementation 300 of the NCO and clock generation control module of FIG. 3 also includes a first multiplexer 302. The first multiplexer 302 receives inputs "0xd174" 304 and "0xd175" 306 and produces an output 309 based on a select-line input 308. 0xd174 304 and 0xd175 306 are phase constants for a sampling rate conversion from 40 MHz to 22 MHz. The select-line input 308 receives a value corresponding to an "OR" operation between an Mu_index [3] value and an Mu_index[0] value (i.e., Mu_index[3] ||Mu_index[0]). The result of the "OR" operation selects one of the inputs 304, 306 of the first multiplexer 302 to be sent to the output 309. The output 309 of the first multiplexer 302 is received at an adder 310, which also receives an Mu tr[16:0] value 312 and an Mu[15:0] value 314. An output 318 of the adder 310 is received at a second multiplexer 316. The second multiplexer 316 also receives as an input the Mu[15:0] value 314, and the Mu[15:0] value 314 is also provided to the second multiplexer 316 on a select-line input mu[16] 320. An output 320 of the second multiplexer 316 is latched by the clock CK40M signal 328 into flip flop 322, which produces the Mu[16:0] value 324 as an output. An output rate of the flip flop 322 is 40 MHz, based on the receipt of the CK40M signal 328 at the flip flop 322.

Figure 4:
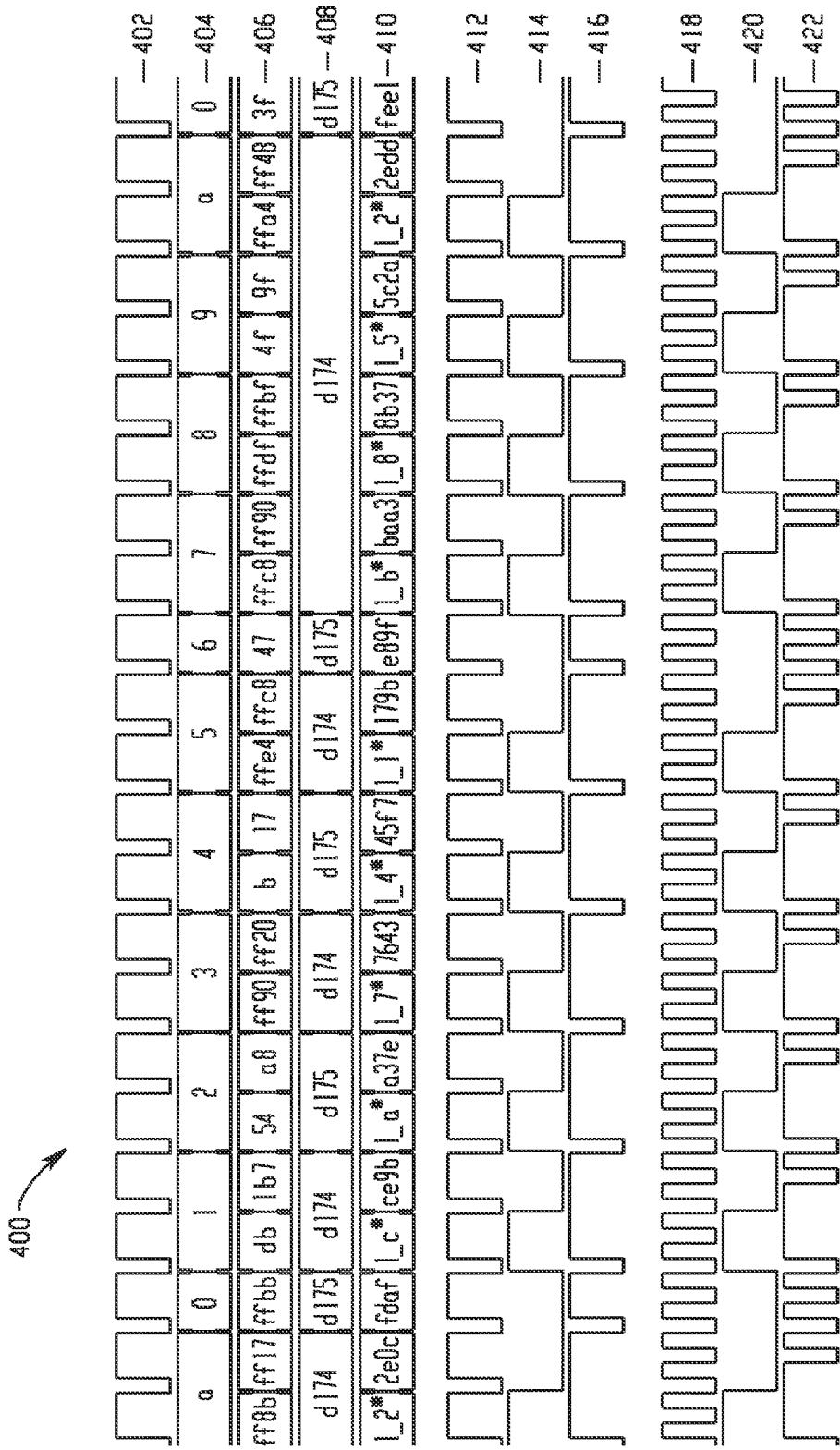
FIG. 4 depicts waveforms of certain signals used in a numerically controlled oscillator (NCO) and clock gating control module.

FIG. 4 depicts waveforms 400 of certain signals used in a numerically controlled oscillator (NCO) and clock gating control module. The waveforms 400 of FIG. 4 may be those used in the example implementation 300 of the numerically controlled oscillator (NCO) and clock gating control module of FIG. 3, for example. Waveforms 402-410 are relevant to a phase computation that occurs in the numerically controlled oscillator (NCO) and clock gating control module. Waveform 402 corresponds to the CK40M signal 328 of FIG. 3 (i.e., a 40 MHz clock sampling frequency). Waveform 404 corresponds to the mu_index[3] ||mu_index[0] signal 308 that is received at the multiplexer select line of the first multiplexer 302 of FIG. 3. Waveform 406 corresponds to the Mu[15:0] signal that is received at the second multiplexer 316 of FIG. 3. Waveform 408 represents a mu_delt[15:0] signal that corresponds to the output 309 of the first multiplexer 302. As is illustrated in FIG. 4, the waveform 408 varies between values of "0xd174" and "0xd175," based on changes in value of the waveform 404 (i.e., the mu_index[3]||mu_index[0] value 308 that is input to the select line input of the first multiplexer 302). Waveform 410 represents the Mu[16:0] value 324 of FIG. 3 that is output by the flip flop 322.

Waveforms 412-416 are relevant to generating a 22 MHz clock in the example implementation of the NCO and clock gating control module. Waveform 412 corresponds to the CK40M signal 328 of FIG. 3 (i.e., the 40 MHz clock sampling frequency). Waveform 414 corresponds to the Mu[16] value 320 of FIG. 3 that is received on the select line input of the second multiplexer 316 and at the adder 310. Waveform 416 corresponds to the CK22M signal 322 that is produced by the clock gating cell 330 of FIG. 3 as a result of the clock gating operation performed based on the ~mu[16] value 326 and the CK40M signal 328.

Waveforms 418-422 are relevant to generating a 44 MHz clock in the example implementation of the NCO and clock gating control module. Waveform 418 corresponds to the CK80M signal 334 of FIG. 3 (i.e., the 80 MHz clock sampling frequency). Waveform 420 corresponds to the Mu[16] value 320 of FIG. 3 that is received on the select line input of the second multiplexer 316 and at the adder 310. Waveform 422 corresponds to the CK44M signal 334 that is produced by the clock gating cell 336 of FIG. 3 as a result of the clock gating operation performed based on the ~mu[16] value 326 and the CK80M signal 334.

With reference again to FIG. 2, the single clock baseband processor 200 also includes single carrier transmitter circuitry and multi-carrier transmitter circuitry. To transmit a single carrier signal, data to be transmitted is provided from the MAC layer 236 to an 802.11b Barker/CCK code generation module 248 via the MDI 234. All of the processing within the 802.11b Barker/CCK code generation module 248 is driven by an 88 MHz clock sampling frequency. A data sequence generated by the 802.11b Barker/CCK code generation module 248 is written to a data buffer and re-sampler control module 250 at 88 MHz. The output rate of the 802.11b Barker/CCK code generation module 248 may be at 11 MHz and filtered/upsampled to 88 MHz. In the data buffer and re-sampler control module 250, an output data sequence is read out continuously at an 80 MHz rate and fed into an 802.11b transmission filter/re-sampler module 252. The 802.11b transmission filter/re-sampler module 252 utilizes components and signals known to those of ordinary skill in the art (e.g., scrambler circuits or components and p_shape, upcvr, and DVGA signals or circuits, etc.). The output of the 802.11b transmission filter/re-sampler module 252 is also at 80 MHz. The clock generation/gating and distribution module 216 is used to generate the 80 MHz clock sampling frequency and the 88 MHz clock sampling frequency from the 320 MHz clock 214. As is illustrated in further detail below, the 88 MHz clock is a not a regular 50/50 duty cycle clock.

After re-sampling, the single carrier data sequence is processed in a same or similar manner as an OFDM signal. Thus, an output from the 802.11b transmission filter/re-sampler module 252 is received at an 802.11b/OFDM common function module 254 and subsequently transmitted to the DAC 256. In the event that the signal to be transmitted is a multi-carrier signal, the baseband processor 204 also includes multi-carrier transmitter circuitry. To transmit the multi-carrier signal, data to be transmitted is provided from the MAC layer 236 to an OFDM transmission module 246. An output from the OFDM transmission module 246 is provided to the 802.11b/OFDM common function module 254 and subsequently transmitted to the DAC 256.

Figure 5:
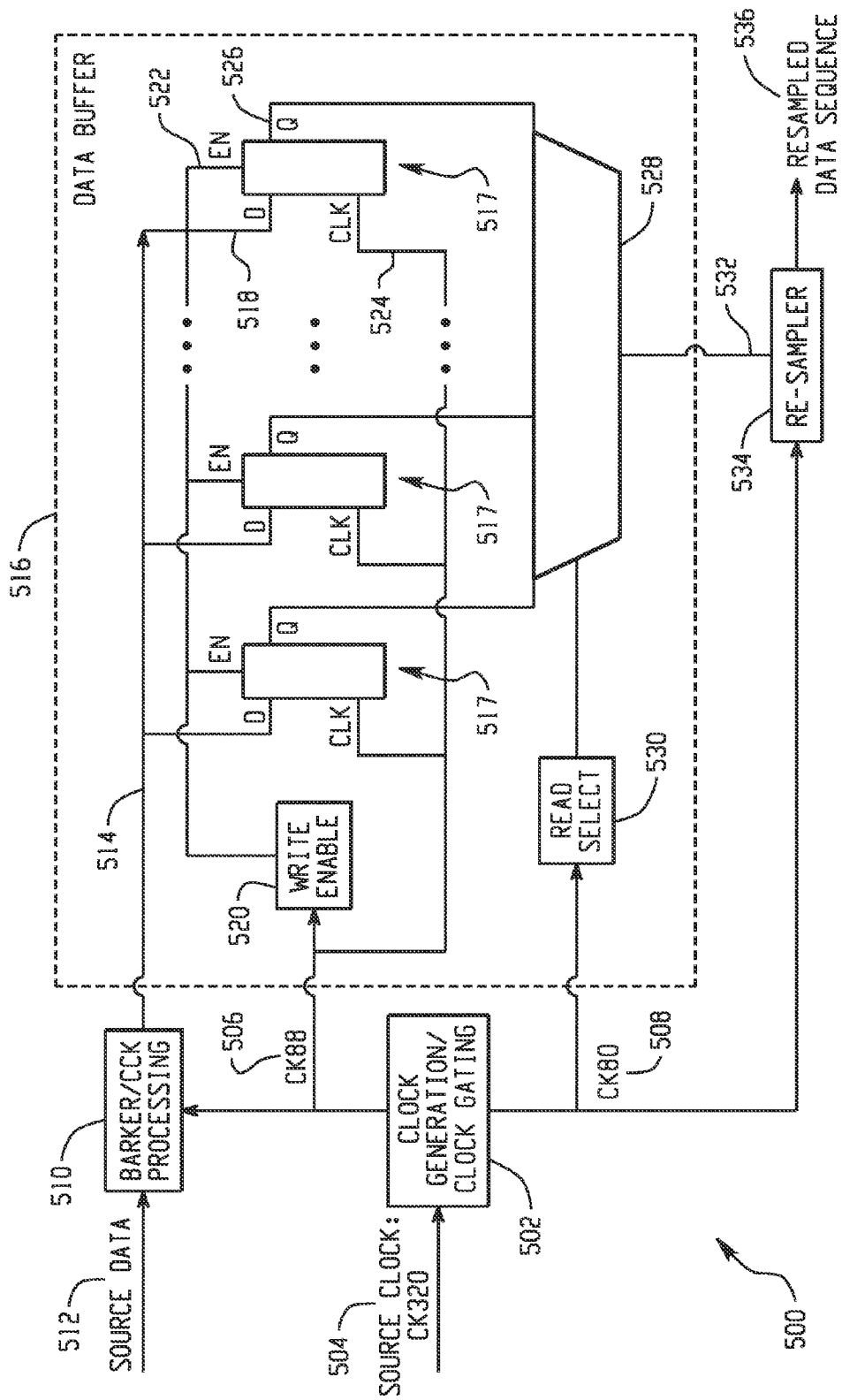
FIG. 5 is a block diagram illustrating an example implementation of single carrier transmission circuitry for use in a baseband processor.

FIG. 5 is a block diagram illustrating an example implementation 500 of single carrier transmission circuitry for use in a baseband processor. The example implementation 500 of the single carrier transmission circuitry of FIG. 5 may be implemented in the context of the baseband processor 204 of FIG. 2 (e.g., as the 802.11b Barker/CCK code generation module 248, the data buffer and re-sampler control module 250, and the 802.11b TX filter/re-sampler 252 of FIG. 2). In the example implementation 500 of FIG. 5, single carrier source data 512 to be transmitted is received at a Barker/CCK encoding module 510. All processing in the Barker/CCK encoding module 510 is driven by a CK88 signal 506 (i.e., an 88 MHz clock sampling frequency) that is received from a clock generation/clock gating module 502. The clock generation/clock gating module 502 generates the 88 MHz clock sampling frequency 506 based on a received 320 MHz source clock 504. The clock generation/clock gating module 502 also generates an 80 MHz clock sampling frequency signal 508 that is provided to a data buffer 516 and a re-sampler 534.

A data sequence 514 generated by the Barker/CCK encoding module 510 is written to the data buffer at 88 MHz. The data buffer 516 includes a plurality of D flip flops 517 that are used to latch data prior to reading out the data to the re-sampler 534. To latch data from the data sequence 514, the data sequence 514 is received at a data input pin 518 of the D flip flops 517. A clock input pin 524 of the D flip flops 517 receives the 88 MHz clock sampling frequency 506 generated by the clock generation/clock gating module 502. The 88 MHz clock sampling frequency generated by the clock generation/clock gating module 502 is also received at a write enable module of the data buffer 516, which uses the 88 MHz clock sampling frequency to supply an input to an enable pin 522 of the D flip flops 517. Output pins 526 of the D flip flops 517 provide an output to a multiplexer 528. A select-line input of the multiplexer 528 receives an input from a read select module 530 of the data buffer 516. The read select module 530 receives the 80 MHz clock sampling frequency 508 that is generated by the clock generation/clock gating module 502 and uses the 80 MHz clock sampling frequency 508 in producing an output. The output of the read select module 530 is used in selecting one of the inputs 526 of the multiplexer 528 to be output by the multiplexer 528. The output of the multiplexer 528 is an output 532 of the data buffer 516, which is read out continuously at the 80 MHz clock sampling frequency 508 that is provided to the read select module 530. The output 532 of the data buffer 516 is received by the re-sampler 534. A re-sampled data sequence output 536 of the re-sampling filter is also at 80 MHz, based on the 80 MHz clock sampling frequency 508 received by the re-sampler 534. In the example implementation 500 of the single carrier transmission circuitry illustrated in FIG. 5, flow control is utilized to prevent the data buffer 516 from overflowing. The flow control may involve using a clock that is faster than the highest clock rate in the example implementation (i.e., a clock that is faster than the 88 MHz clock sampling frequency).

Figure 6:
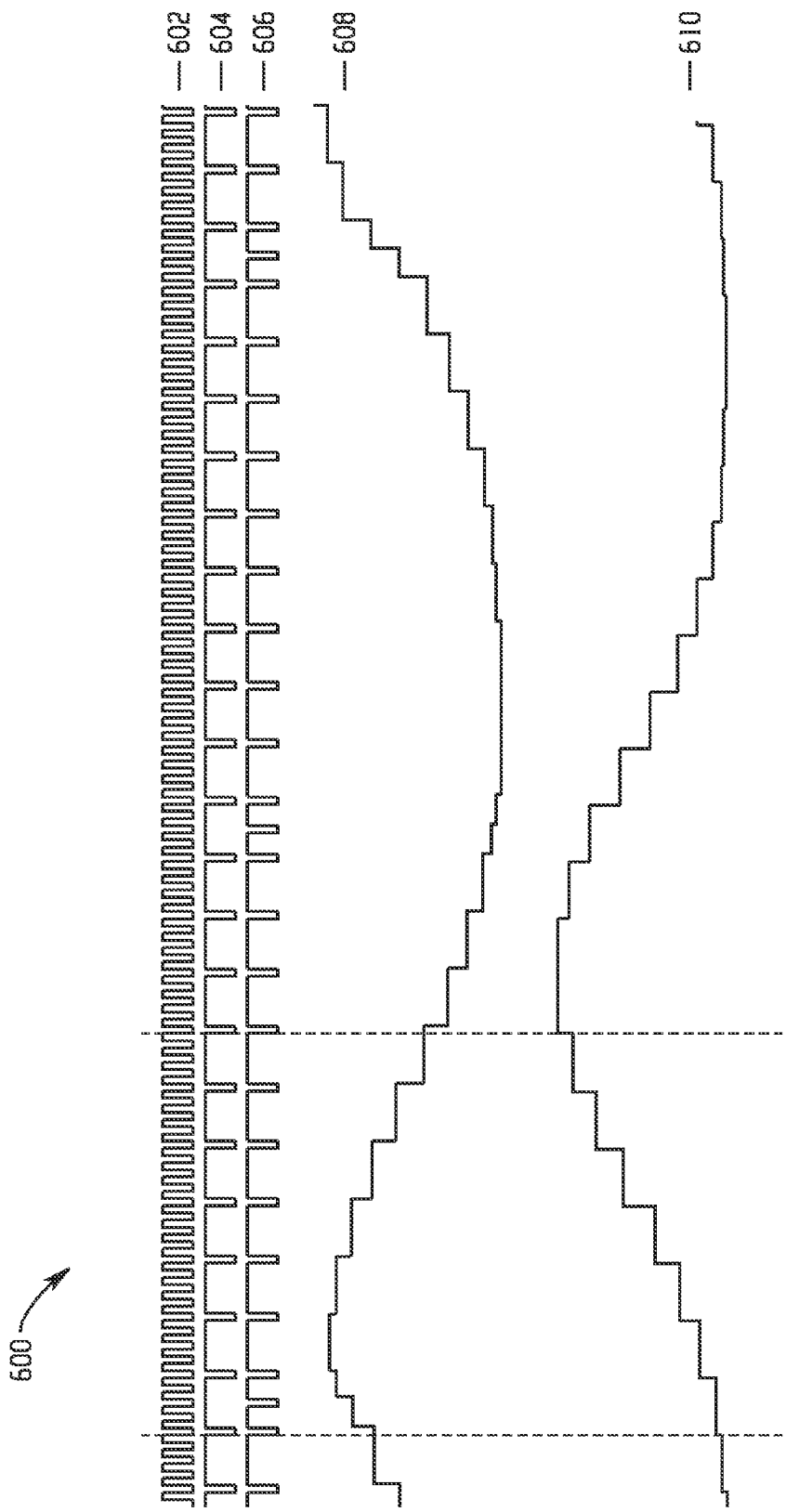
FIG. 6 depicts waveforms of certain signals used in an example implementation of single carrier transmission circuitry.

FIG. 6 depicts waveforms 600 of certain signals used in an example implementation of single carrier transmission circuitry. The waveforms 600 of FIG. 6 may be those used in the example implementation 500 of the single carrier transmission circuitry of FIG. 5, for example. Waveform 602 is a 320 MHz clock signal that corresponds to an output of the source clock CK320 signal 504 in FIG. 5. The 320 MHz waveform 602 is received by a clock generation/clock gating module (e.g., the clock generation/clock gating module 502 of FIG. 5) and used to generate waveforms 604 and 606, which are 80 MHz and 88 MHz clock sampling frequencies, respectively. As illustrated in FIG. 6, the 88 MHz clock sampling frequency 606 is not a regular 50/50 duty cycle clock. Waveform 608 corresponds to data sequence 514 generated by the Barker/CCK encoding module 510 in FIG. 5. The waveform 608 is written to a data buffer (e.g., the data buffer 516 of FIG. 5) at 88 MHz. Waveform 610 corresponds to data sequence 536 generated by the re-sampler 534 in FIG. 5. The data buffer that receives the waveform 608 reads out a data sequence continuously at an 80 MHz rate, which is subsequently fed into the re-sampler (i.e, the re-sampler 534 of FIG. 5). Waveform 610, representing the output of the re-sampler, also has a rate of 80 MHz.

Figure 7:
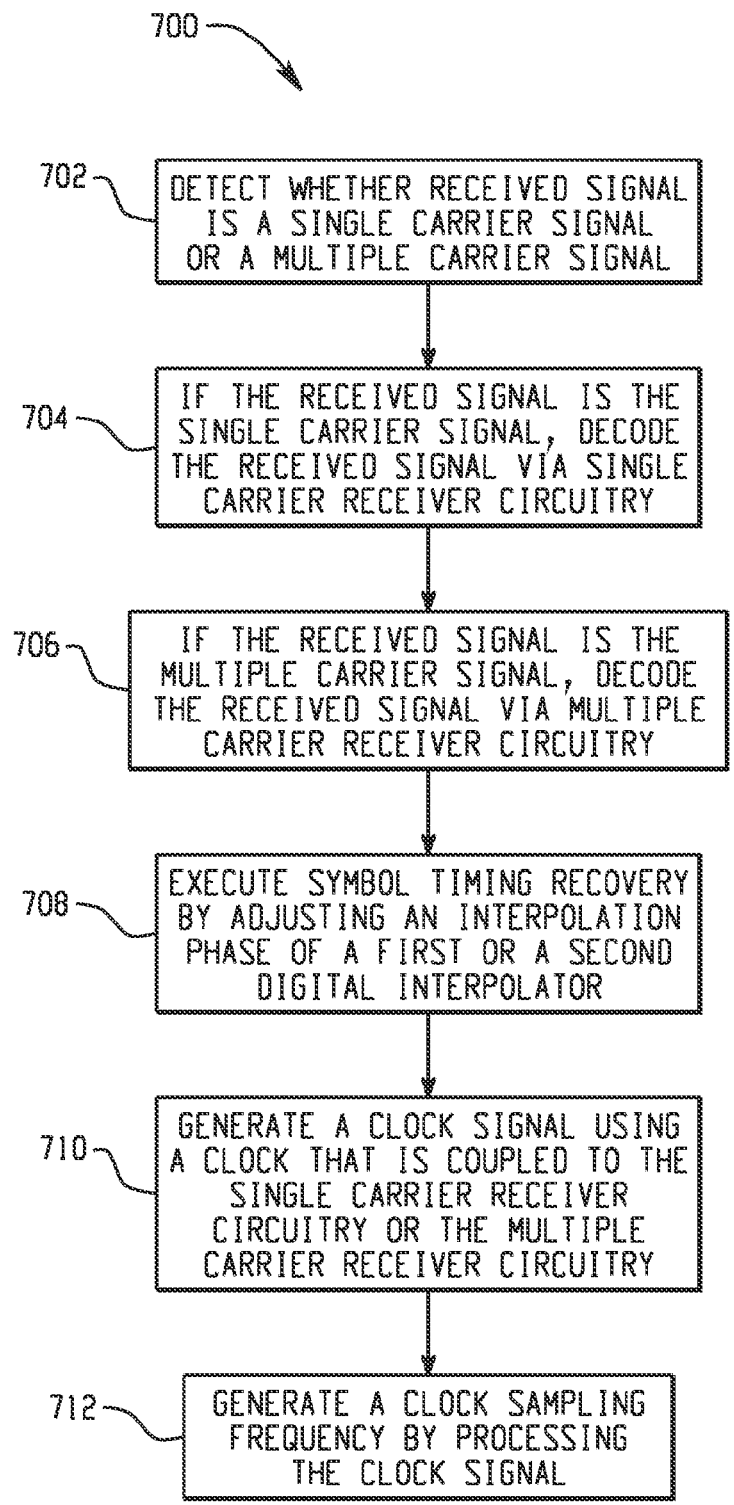
FIG. 7 is a flowchart illustrating an example method for processing a received signal at a baseband processor, where the received signal is associated with one or more wireless communication protocols.

FIG. 7 is a flowchart 700 illustrating an example method for processing a received signal at a baseband processor, where the received signal is associated with one or more wireless communication protocols. At 702, the received signal is detected as being is a single carrier signal or a multi-carrier signal. At 704, if the received signal is the single carrier signal, the received signal is demodulated via single carrier receiver circuitry, where the single carrier receiver circuitry includes a first digital interpolator. At 706, if the received signal is the multi-carrier signal, the received signal is demodulated via multi-carrier receiver circuitry, where the multi-carrier receiver circuitry includes a second digital interpolator. At 708, symbol timing recovery is executed by adjusting an interpolation phase of the first digital interpolator or the second digital interpolator. At 710, a clock signal is generated using a clock that is coupled to the single carrier receiver circuitry and coupled to the multi-carrier receiver circuitry. At 712, a clock sampling frequency is generated by processing the clock signal. The clock sampling frequency is received by the single carrier receiver circuitry or the multi-carrier receiver circuitry for demodulating the single carrier signal or the multi-carrier signal.

Figure 8:
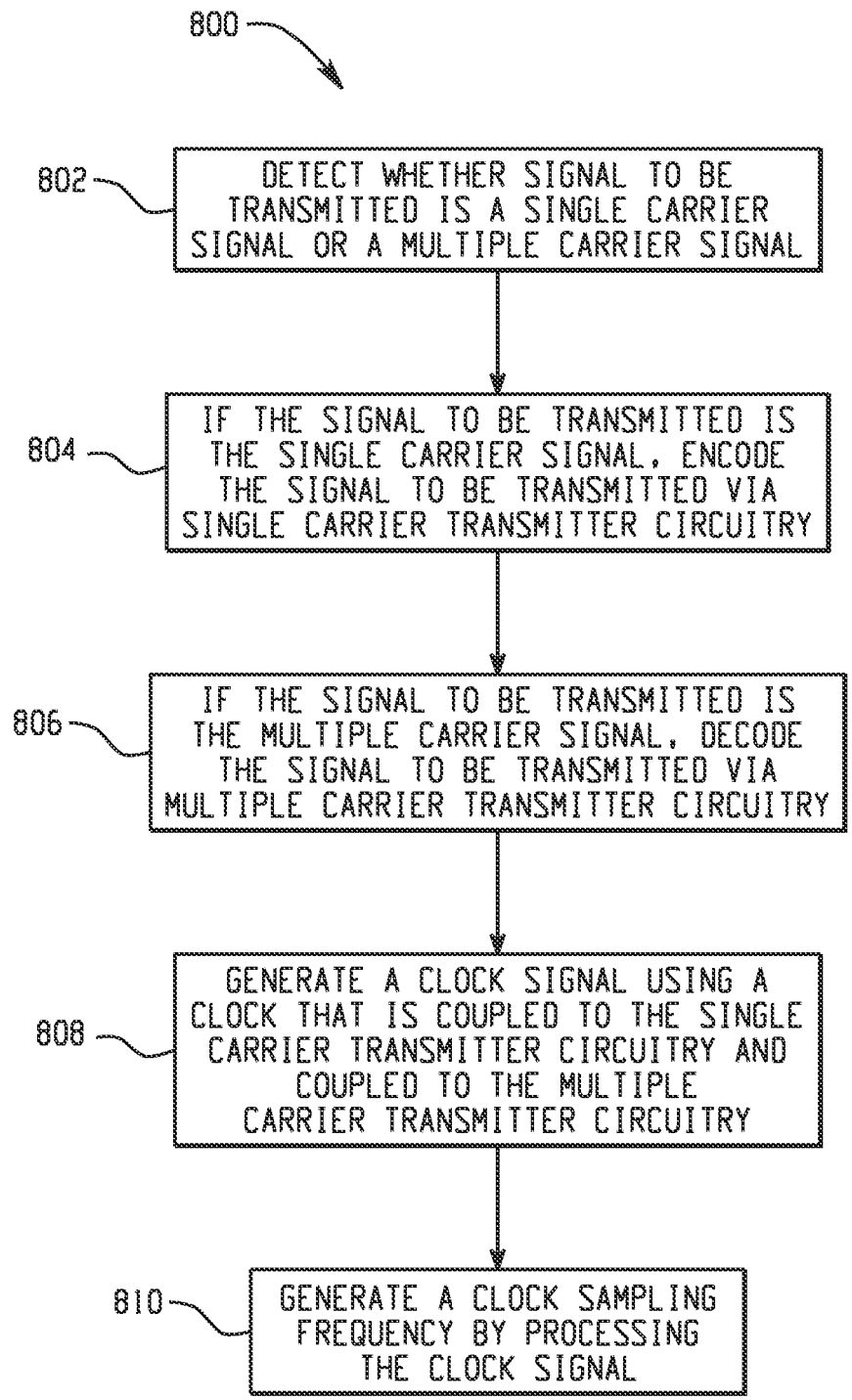
FIG. 8 is a flowchart illustrating an example method for processing a signal to be transmitted at a baseband processor, where the signal to be transmitted is associated with one or more wireless communication protocols.

FIG. 8 is a flowchart 800 illustrating an example method for processing a signal to be transmitted at a baseband processor, where the signal to be transmitted is associated with one or more wireless communication protocols. At 802, the signal to be transmitted is detected as being a single carrier signal or a multi-carrier signal. At 804, if the signal to be transmitted is the single carrier signal, the signal to be transmitted is encoded via single carrier transmitter circuitry. At 806, if the signal to be transmitted is the multi-carrier signal, the signal to be transmitted is encoded via multi-carrier receiver circuitry. At 808, a clock signal is generated using a clock that is coupled to the single carrier transmitter circuitry and coupled to the multi-carrier transmitter circuitry. At 810, a clock sampling frequency is generated by processing the clock signal. The clock sampling frequency is received by the single carrier transmitter circuitry or the multi-carrier transmitter circuitry for encoding the single carrier signal or the multi-carrier signal.

This written description uses examples to disclose the invention, including the best mode, and also to enable a person skilled in the art to make and use the invention. The patentable scope of the invention may include other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. An apparatus for receiving signals associated with one or more wireless communication protocols, the apparatus comprising:
    single carrier receiver circuitry for demodulating a received single carrier signal, the single carrier receiver circuitry including,
        a first digital interpolator comprising a linear interpolator operating at a first clock sampling frequency, wherein the first digital interpolator has an input data rate at the first clock sampling frequency and an output data rate at a second clock sampling frequency,
        a decoding core for decoding the received single carrier signal using a third clock sampling frequency that is an integer multiple of the second clock sampling frequency,
        a numerically controlled oscillator configured to adjust the interpolation phase of the first digital interpolator, and
        a clock generation control module configured to receive a clock signal to generate the second a the third clock sampling frequencies based on a control signal;
    multi-carrier receiver circuitry for demodulating a received multi-carrier signal, the multi-carrier receiver circuitry including a second digital interpolator, wherein symbol timing recovery is executed in the apparatus by adjusting an interpolation phase of the first digital interpolator or the second digital interpolator; and
    a clock coupled to the single carrier receiver circuitry and coupled to the multi-carrier receiver circuitry, the clock being configured to supply the clock signal that is processed to generate a plurality of clock sampling frequencies for demodulating the received single carrier signal and the received multi-carrier signal.

2. The apparatus of claim 1, wherein the second clock sampling frequency is generated based on a first clock gating operation performed using the control signal and a signal having the first clock sampling frequency, and wherein the third clock sampling frequency is generated based on a second clock gating operation performed using the control signal and a signal having a frequency that is an integer multiple of the first clock sampling frequency.

3. The apparatus of claim 1, wherein the first clock sampling frequency is 40 MHz, wherein the second clock sampling frequency is 22 MHz, and wherein the third clock sampling frequency is 44 MHz.

4. The apparatus of claim 1, further comprising:
    an analog-to-digital converter (ADC) coupled to the single carrier receiver circuitry, the multi-carrier receiver circuitry, and the clock, wherein the ADC operates at a first clock sampling rate; and
    the second digital interpolator being a cubic interpolator that operates at the first clock sampling rate.

5. The apparatus of claim 1, further comprising:
    an analog-to-digital converter (ADC) configured to convert the received single carrier signal or the received multi-carrier signal from an analog signal to a digital signal;

the first digital interpolator of a first interpolator type that is coupled to the ADC via a first data path, wherein the first digital interpolator is configured to run prior to a point in time in which a packet is detected and after the received single carrier signal is detected; and the second digital interpolator of a second interpolator type that is coupled to the ADC via the first data path and that has a different control scheme than that of the first interpolator type, wherein the second digital interpolator is configured to run after the received multi-carrier signal is detected.

6. The apparatus of claim 1, wherein the received single carrier signal complies with an IEEE 802.11b standard, and wherein the received multi-carrier signal is an orthogonal frequency-division multiplexing (OFDM) signal that complies with an IEEE 802.11a standard, an IEEE 802.11n standard, or an IEEE 802.11ac standard.

7. The apparatus of claim 1, wherein a second clock is not included in the apparatus, and wherein the clock signal is processed to generate the plurality of clock sampling frequencies to decode both the received single carrier signal and the received multi-carrier signal.

8. The apparatus of claim 1, further comprising:
an analog-to-digital converter (ADC) coupled to the single carrier receiver circuitry, the multi-carrier receiver circuitry, and the clock, wherein a clock sampling phase of the ADC does not change, and wherein an analog clock phase interpolator is not included in the apparatus.

9. The apparatus of claim 1, wherein the clock operates at a frequency of 320 MHz.

10. A baseband processor having receiver circuitry and transmitter circuitry for full-duplex communication of signals associated with one or more wireless communication protocols, the baseband processor comprising:
the receiver circuitry including:
single carrier receiver circuitry for demodulating a received single carrier signal, the single carrier receiver circuitry including,
a first digital interpolator comprising a linear interpolator operating at a first clock sampling frequency, wherein the first digital interpolator has an input data rate at the first clock sampling frequency and an output data rate at a second clock sampling frequency,
a decoding core for decoding the received single carrier signal using a third clock sampling frequency that is an integer multiple of the second clock sampling frequency,
a numerically controlled oscillator configured to adjust the interpolation phase of the first digital interpolator, and
a clock generation control module configured to receive a clock signal to generate the second and the third clock sampling frequencies based on a control signal, and
multi-carrier receiver circuitry for demodulating a received multi-carrier signal, the multi-carrier receiver circuitry including a second digital interpolator, wherein symbol timing recovery is executed in the baseband processor by adjusting an interpolation phase of the first digital interpolator or the second digital interpolator;
the transmitter circuitry for encoding a signal to be transmitted, the signal to be transmitted being a single carrier signal or a multi-carrier signal; and a clock coupled to the receiver circuitry and coupled to the transmitter circuitry, the clock being configured to supply the clock signal that is processed to generate a plurality of clock sampling frequencies for sending and receiving both a single carrier signal and a multi-carrier signal.

11. A method for processing a received signal at a baseband processor, the received signal being associated with one or more wireless communication protocols, the method comprising:
detecting whether t received signal is a single carrier signal or a multi-carrier signal;
if the received signal is the single carrier signal, demodulating the received signal via single carrier receiver circuitry, the single carrier receiver circuitry including a first digital interpolator operating at first clock sampling frequency, wherein the first digital interpolator has an input data rate at the first clock sampling frequency and an output data rate at a second clock sampling frequency;
if the received signal is the multi-carrier signal, demodulating the received signal via multi-carrier receiver circuitry, the multi receiver circuitry including a second digital interpolator;
executing symbol timing recovery in the baseband processor by adjusting an interpolation phase of the first digital interpolator or the second digital interpolator using a numerically controlled oscillator;
generating a clock signal using a clock that is coupled to the single carrier receiver circuitry and coupled to the multi-carrier receiver circuitry;
generating a clock sampling frequency by processing the clock signal, wherein a signal the clock sampling frequency is received by the single carrier receiver circuitry or the multi-carrier receiver circuitry for demodulating the single carrier signal or the multi-carrier signal; and
if the received signal is the single carrier signal,
decoding the single carrier signal using a third clock sampling frequency that is an integer multiple of the second clock sampling frequency, and
receiving the clock signal at a clock generation control module that is configured to generate the second and the third clock sampling frequencies.

12. The method of claim 11, further comprising:
operating the second digital interpolator at the first clock sampling frequency; and
operating an analog-to-digital converter (ADC) at the first clock sampling frequency, wherein the ADC is coupled to the single carrier receiver circuitry, the multi-carrier receiver circuitry, and the clock.

13. The method of claim 11, further comprising:
converting the single carrier signal or the multi-carrier signal from an analog signal to a digital signal at an analog-to-digital converter (ADC);
operating the first digital interpolator prior to a time in which a packet is detected and after the single carrier signal is detected, wherein the first digital interpolator is of a first interpolator type and is coupled to the ADC via a first data path: and
operating the second digital interpolator alter the multi-carrier signal is detected, wherein the second digital interpolator is of a second interpolator type and is coupled to the ADC via the first data path, and wherein the second interpolator type has a different control scheme than that of the first interpolator type.

* * * * *